United States Patent [19]

Hube

[11] Patent Number: 5,517,316
[45] Date of Patent: May 14, 1996

[54] APPARATUS AND METHOD FOR SAVING/STORING JOB RUN INFORMATION GENERATED BY PROCESSING A JOB ON A PRINTING MACHINE

[75] Inventor: Randall R. Hube, Rochester, N.Y.

[73] Assignee: Xerox Corporation, Stamford, Conn.

[21] Appl. No.: 141,762

[22] Filed: Oct. 27, 1993

[51] Int. Cl.⁶ .................... H04N 1/21; H04N 1/00
[52] U.S. Cl. .............. 358/296; 358/403; 358/401
[58] Field of Search ..................... 355/202–204, 355/208; 358/401, 403, 404, 296; 395/600, 650

[56] References Cited

U.S. PATENT DOCUMENTS

| | | | |
|---|---|---|---|
| 4,860,119 | 8/1989 | Maniwa et al. | 358/296 |
| 4,965,613 | 10/1990 | Morris et al. | 346/25 |
| 5,045,880 | 9/1991 | Evanitsky et al. | 355/200 |
| 5,049,929 | 9/1991 | Anderson et al. | 355/204 |
| 5,164,842 | 11/1992 | Gauronski et al. | 358/401 |
| 5,170,340 | 12/1992 | Prokop et al. | 364/143 |
| 5,206,735 | 4/1993 | Gauronski et al. | 358/296 |
| 5,212,786 | 5/1993 | Sathi | 395/600 |
| 5,305,056 | 4/1994 | Salgado et al. | 355/202 |

FOREIGN PATENT DOCUMENTS 2-48681A   2/1990   Japan.

OTHER PUBLICATIONS

Mastering Windows™ 3.1, publisher SYBEX pp. 210–231 ©1992.

Primary Examiner—Peter S. Wong
Assistant Examiner—K. Shin
Attorney, Agent, or Firm—Gary B. Cohen

[57] ABSTRACT

There is provided a printing machine for producing prints from a job, the printing machine including a first memory section for storing the job and a printing section with a second memory section. The second memory section communicates with the first memory section for receiving a copy of the job, the copy of the job being printed at the printing section so that job run information is created in response to the printing of the copy of the job. The created job run information is stored in a third memory section, the third memory section being linked with the first memory section by way of a reference for maintaining a record of the printing operations performed on the job.

17 Claims, 13 Drawing Sheets

APPARATUS AND METHOD FOR SAVING/STORING JOB RUN INFORMATION GENERATED BY PROCESSING A JOB ON A PRINTING MACHINE

The present invention relates generally to a technique for processing jobs in a printing machine and, more particularly, to a technique for saving, storing and accessing job run information generated in response to processing the jobs.

Electronic printing systems typically include an input section, often referred to as an input image terminal ("IIT"), a controller, often referred to as an electronic subsystem ("ESS") and an output section or print engine, often referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340 patentees: Prokop et al. issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. In either case, jobs provided at the IIT are preferably stored in a mass memory, such as the multiple disk arrangement disclosed by the following patent:

U.S. Pat. No. 5,212,786 patentee: Sathi issued: May 18, 1993

In one example, stored jobs are arranged in a job or system file in anticipation of being printed at the IOT. A memory arrangement suitable for such job storage is described in the following patent, the pertinent portions of which are incorporated herein:

U.S. Pat. No. 5,206,735 patentees: Gauronski et al. issued: Apr. 27, 1993

U.S. Pat. No. 5,206,735 discloses a printing arrangement in which a job file is used in conjunction with a print queue to print stored jobs. In particular, when printing is desired, a job in the job file is copied to the print queue where the job is positioned in a selected order among other jobs. Essentially, when operated in a FIFO manner, the copied job is placed in a stack beneath other jobs and, as the other jobs are printed with the printer, the copied job moves up toward the top of the stack until it is eventually printed. In the DocuTech® printing system, as the jobs are printed a record, commonly referred to as "job log", is maintained for each printed job. The job log includes, among other information, indicators relating to the number of sheets printed for each job, the stock characteristics of the printed job and the fonts used to print the printed job.

The following references may be of pertinence to the present background discussion:

Japanese Patent Application No. 2-48681 patentee: Sasahara issued: Feb. 19, 1990

U.S. Pat. No. 4,965,613 patentees: Morris et al. issued: Oct. 23, 1990

U.S. Pat. No. 5,045,880 patentees: Evanitsky et al. issued: Sep. 3, 1991

U.S. Pat. No. 5,049,929 patentees: Anderson et al. issued: Sep. 17, 1991

Japanese Patent Application No. 2-48681 discloses an image forming device which performs image processing to improve the operability of the device by storing an executed function in a history memory at each time of execution of image formation and shifting the stored contents to older address areas by one rank.

U.S. Pat. No. 4,965,613 discloses a data printer that has the ability to read and analyze machine readable information. The system includes a control processor, which depending upon received signals monitors the print quality, issues instructions to print engines to adjust print contrast, and issues instructions to invalidate unacceptable pages. The job control system may assemble messages for the operator apprising him of printer status, recommended corrective actions and information assisting him in performing job reconciliation.

U.S. Pat. No. 5,045,880 discloses a technique for pre-programming a reproduction machine for a plurality of jobs involving a variety of machine features and requirements using an operator console and touch sensitive screen display. The features are automatically stored in the selected pro-programming slot and can be run upon completion of the current job in progress or at a later time at the discretion of the operator.

U.S. Pat. No. 5,049,929 discloses an image forming system which has the capability to deselect one or more conflicting features based on a predetermined level of importance of historical record of selection, such as preservation of the most recently selected feature. Dynamic alteration of the conflict resolution priority is achieved based upon information stored within the system.

In the DocuTech® printing system an original job (or "parent") is maintained in the job file while a copy job (or "offspring") is provided to the print queue. The above-mentioned job log is a record of the individual offspring and may not, under certain circumstances, represent a complete record of the parent. For example, the parent may be the source for many offspring which are printed over an extended period of time. Furthermore, because the job log is a "rolling" history of only the most recently printed offspring, the records of some offspring may "fall off" the log since it is not typically capable of holding more than a preset number of jobs. Moreover, even assuming that an indefinite number of offspring records could be held in the log for an indefinite time interval, scrolling through an extensive log to determine the current status of all the offspring can be time-consuming and inconvenient. Furthermore, such a job log would not provide the information required to link the offspring with the parent that spawned them. It would be desirable to provide a technique in which all job run information relating to the parent's offspring is maintained in a convenient single location associated with the parent.

In accordance with the present invention there is provided a printing machine for producing prints from a job, including: a first memory section for storing the job; a printing section with a second memory section, the second memory section communicating with the first memory section for receiving a copy of the job, the copy of the job being printed at the printing section and job run information being created in response to the printing of the copy of the job; and a third memory section for storing the created job run information, the third memory section being linked with the first memory section by way of a reference for maintaining a record of the printing operations performed on the job.

These and other aspects of the invention will become apparent from the following description, the description being used to illustrate a preferred embodiment of the invention when read in conjunction with the accompanying drawings.

Figure 1:
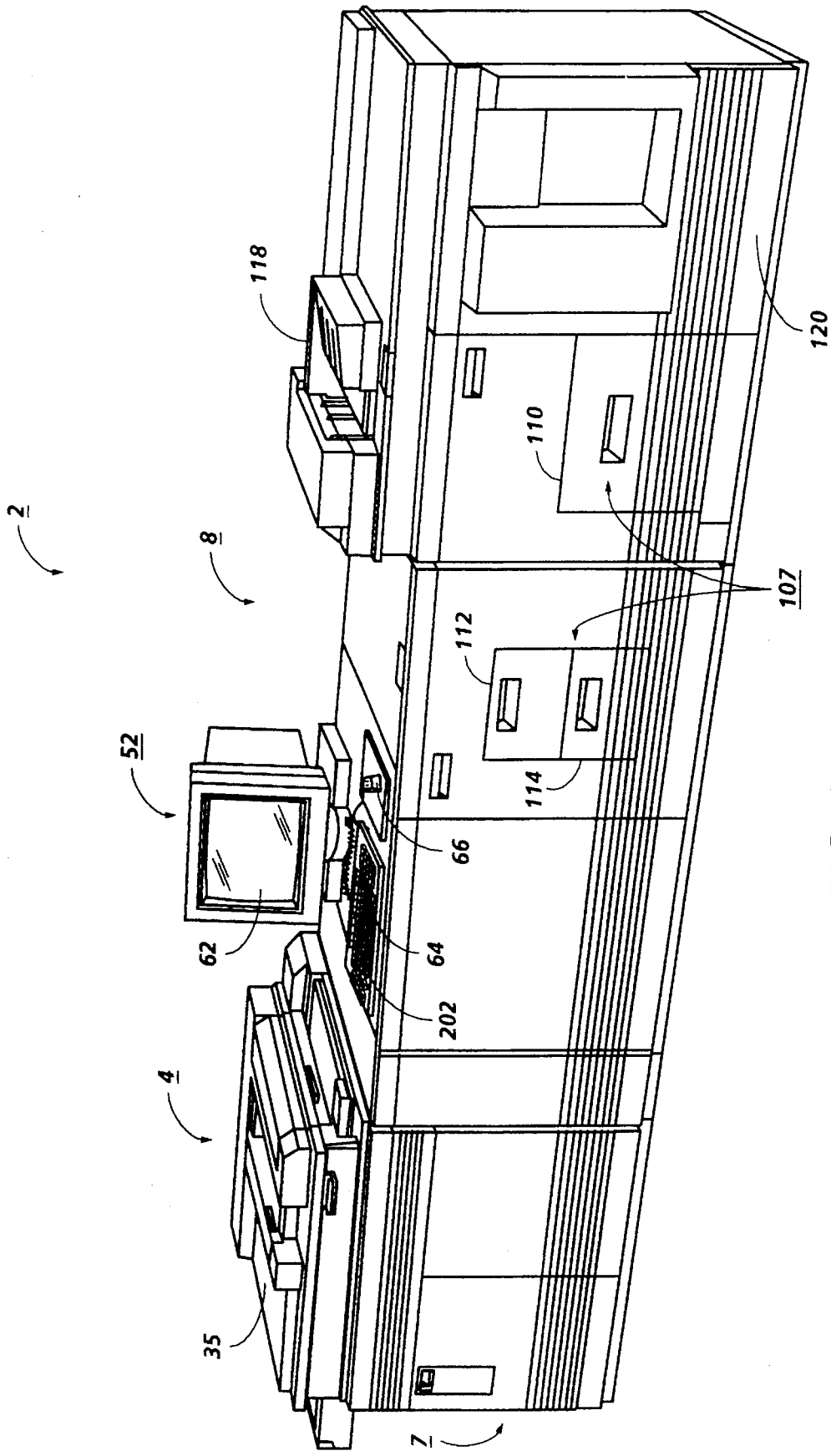
FIG. 1 is a view depicting an electronic printing system of the type adapted to employ the stock substitution system of the present invention.
Figure 3:
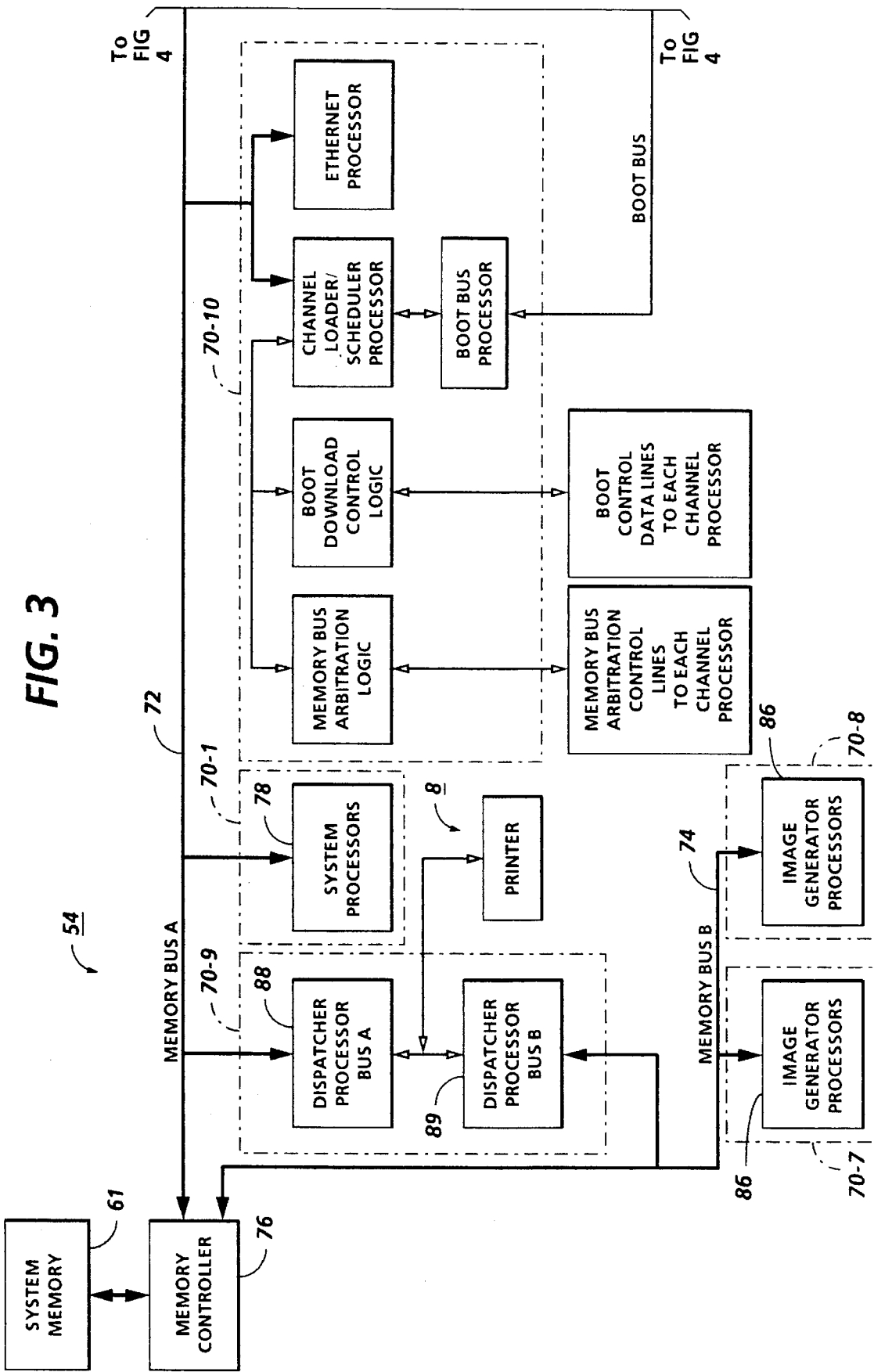
Figure 4:
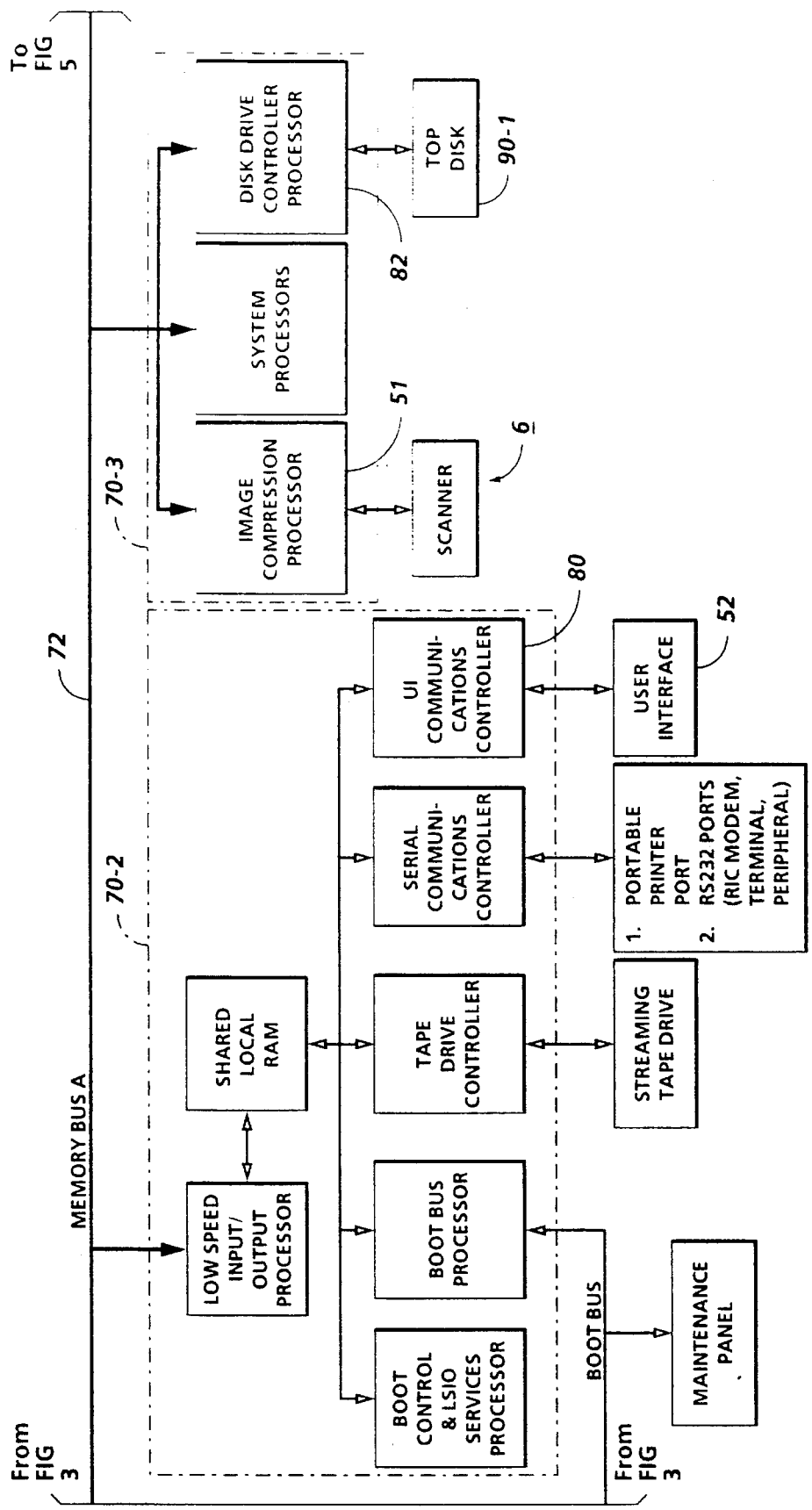
Figure 5:
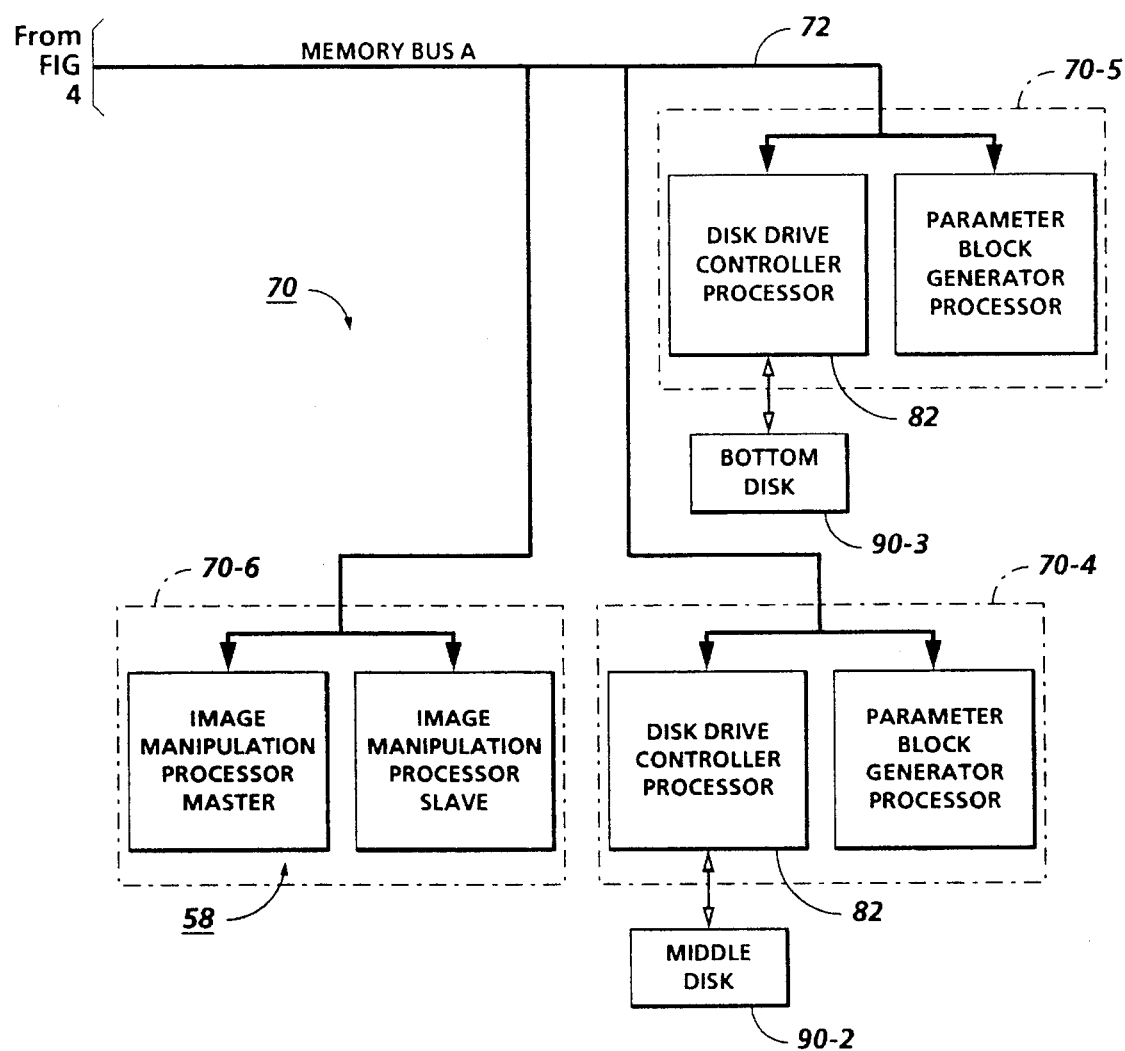
Figure 6:
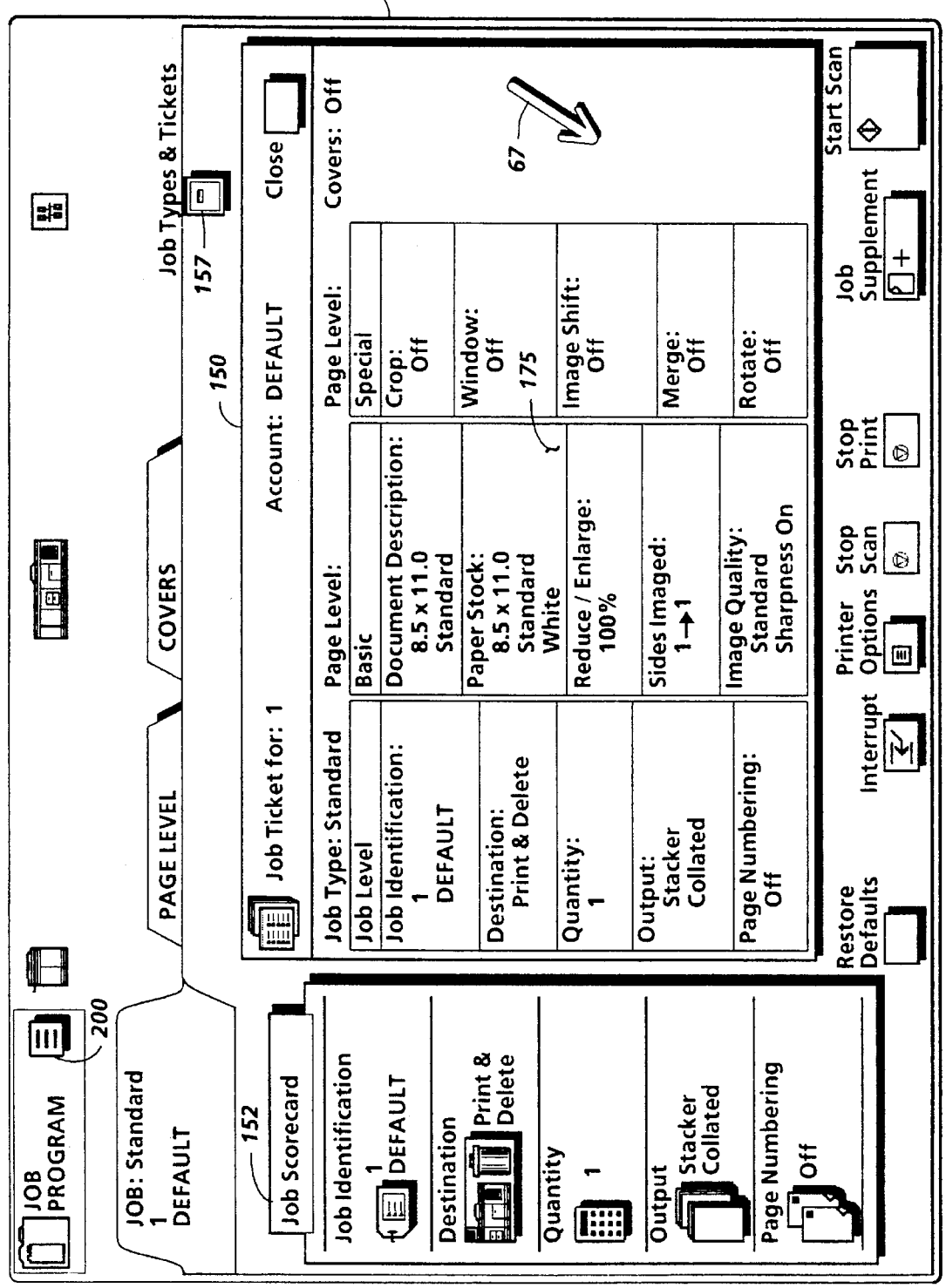
Figure 7:
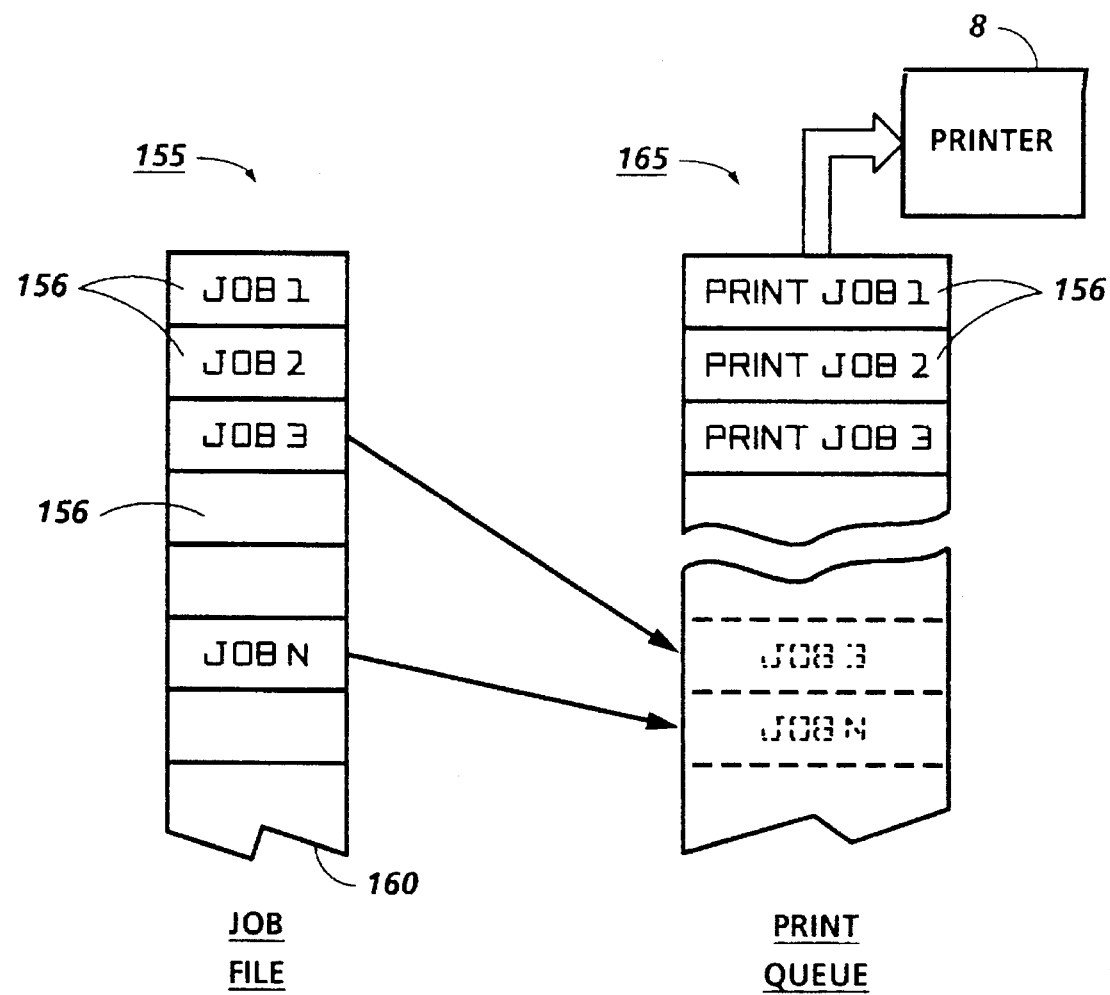
Figure 8:
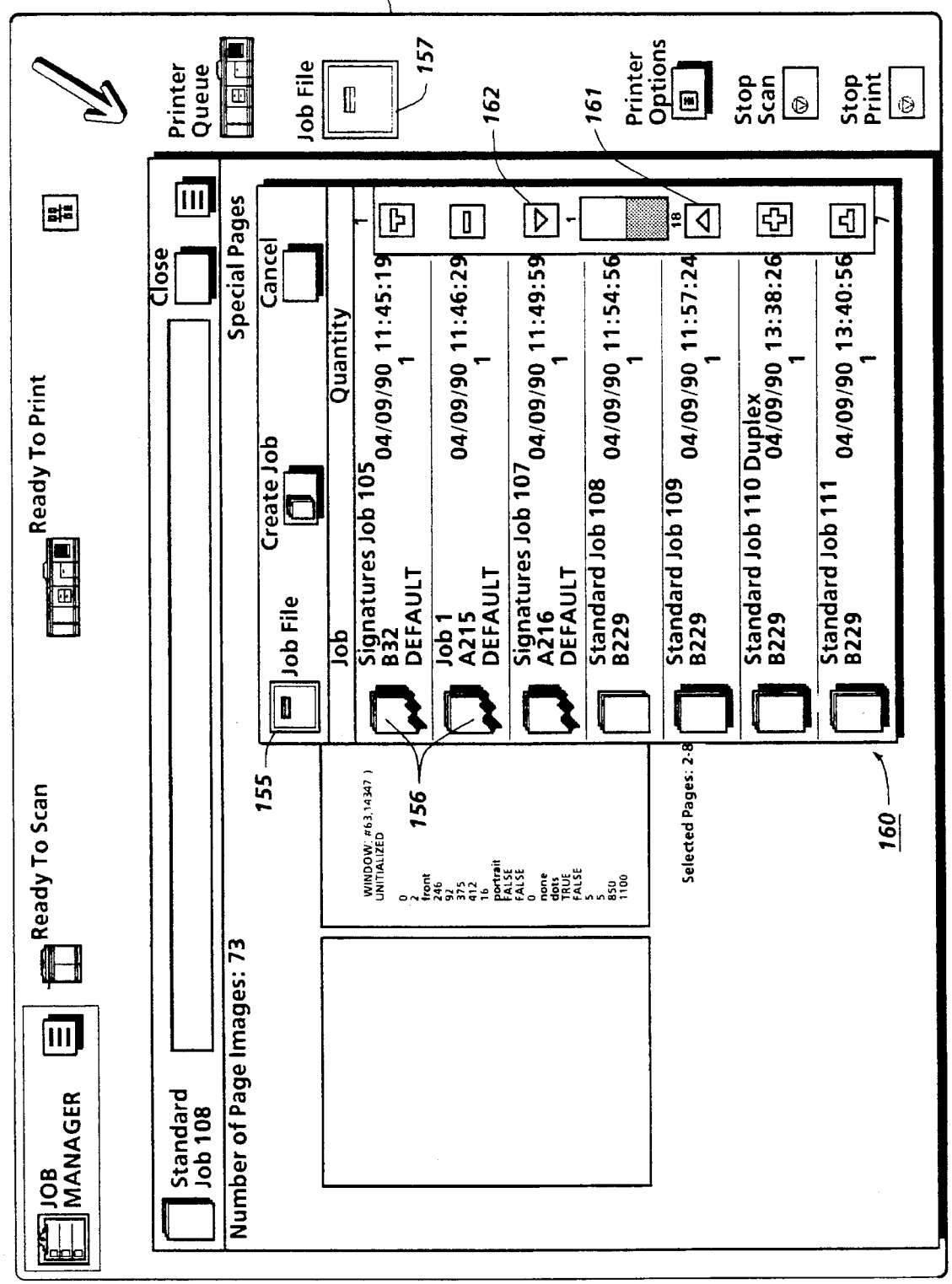
Figure 9:
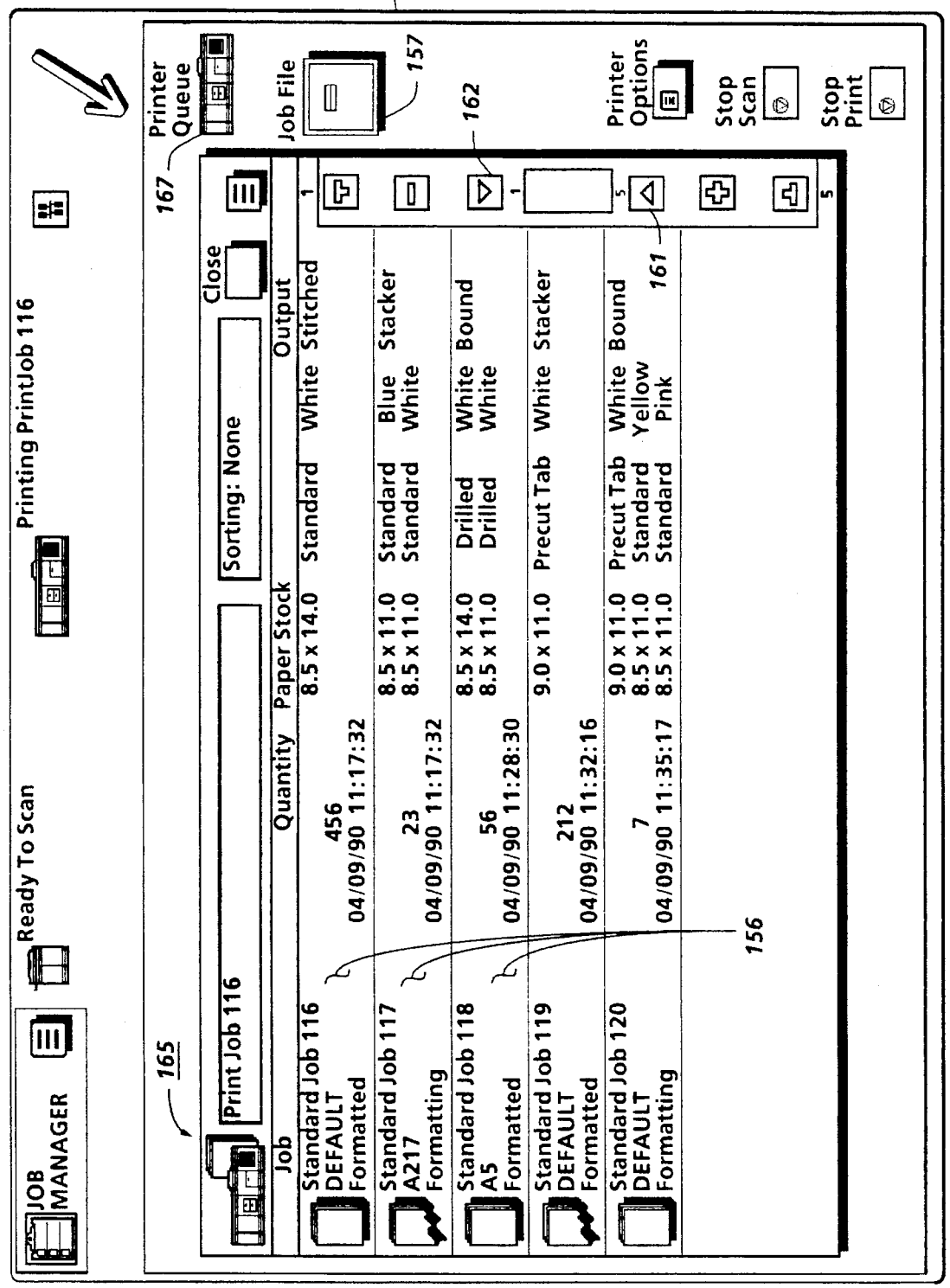
Figure 10:
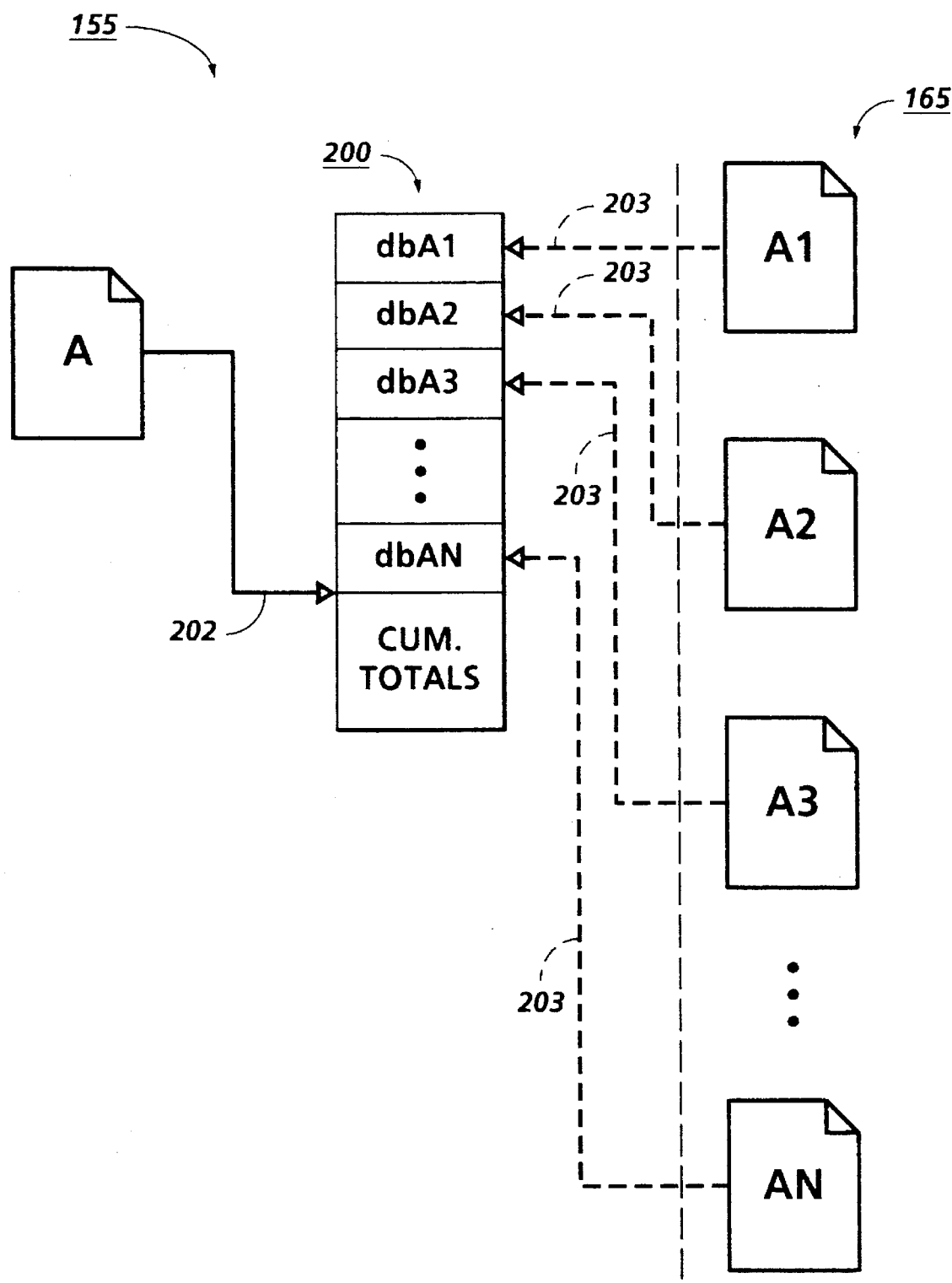
Figure 11:
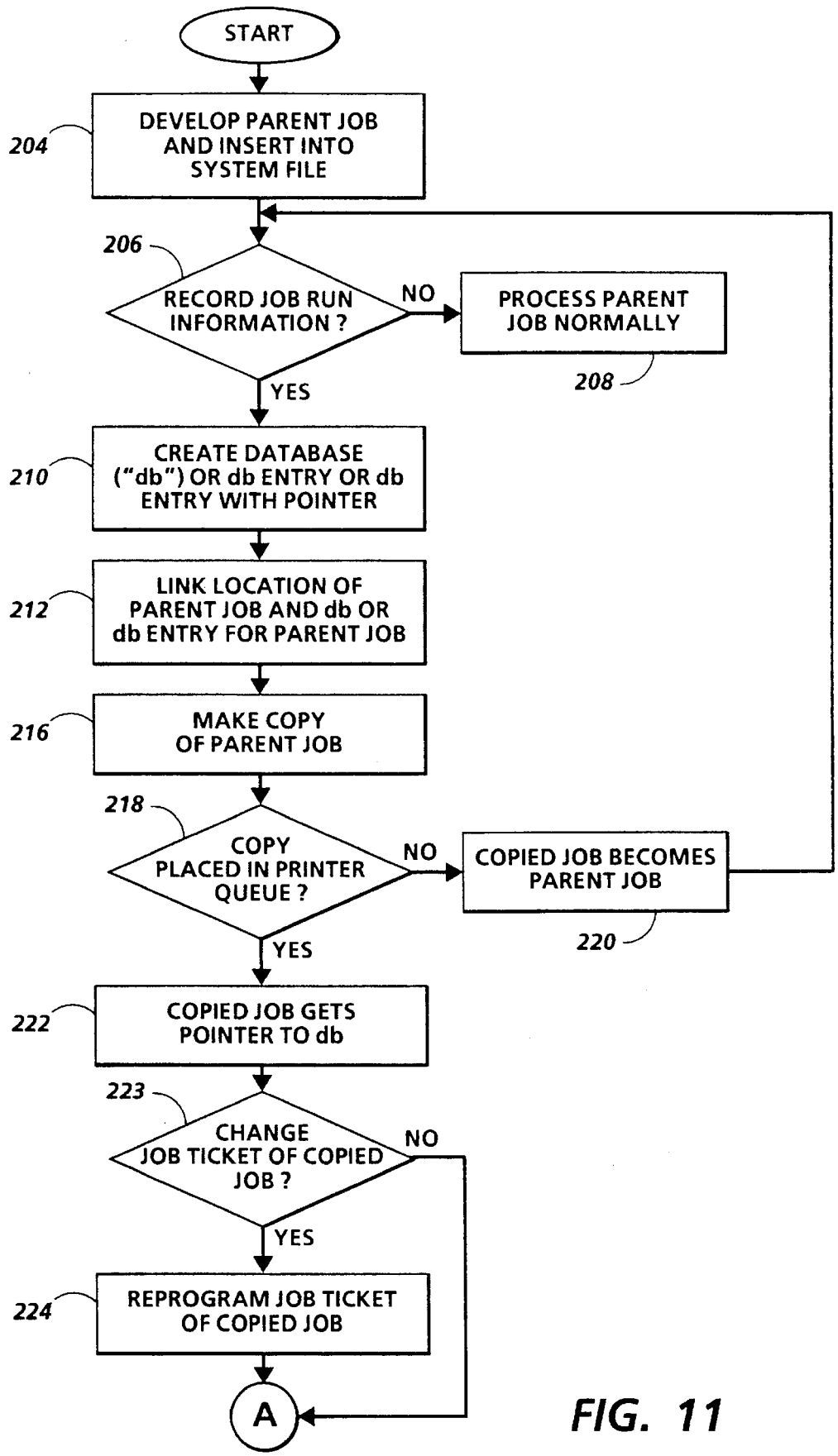
Figure 12:
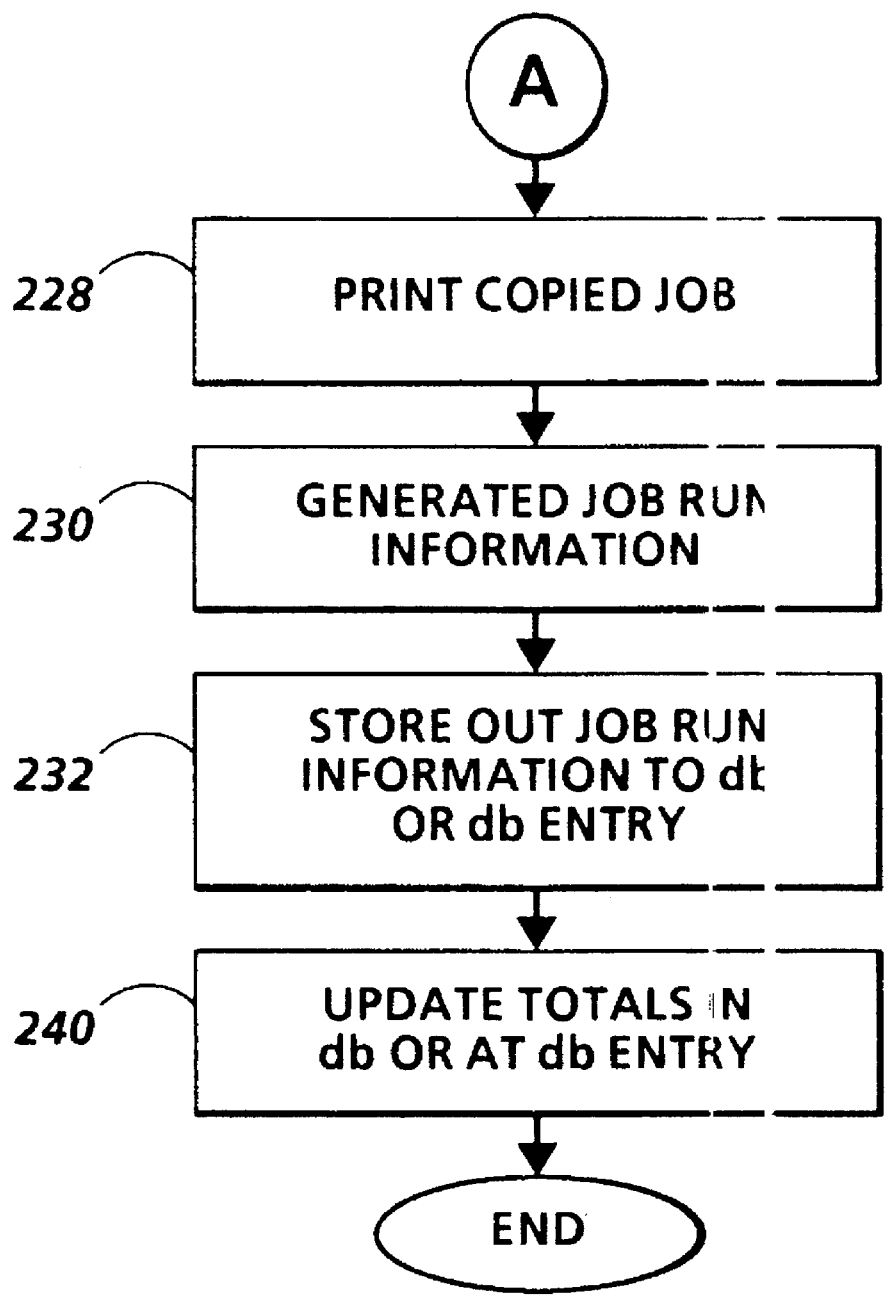
Figure 13:
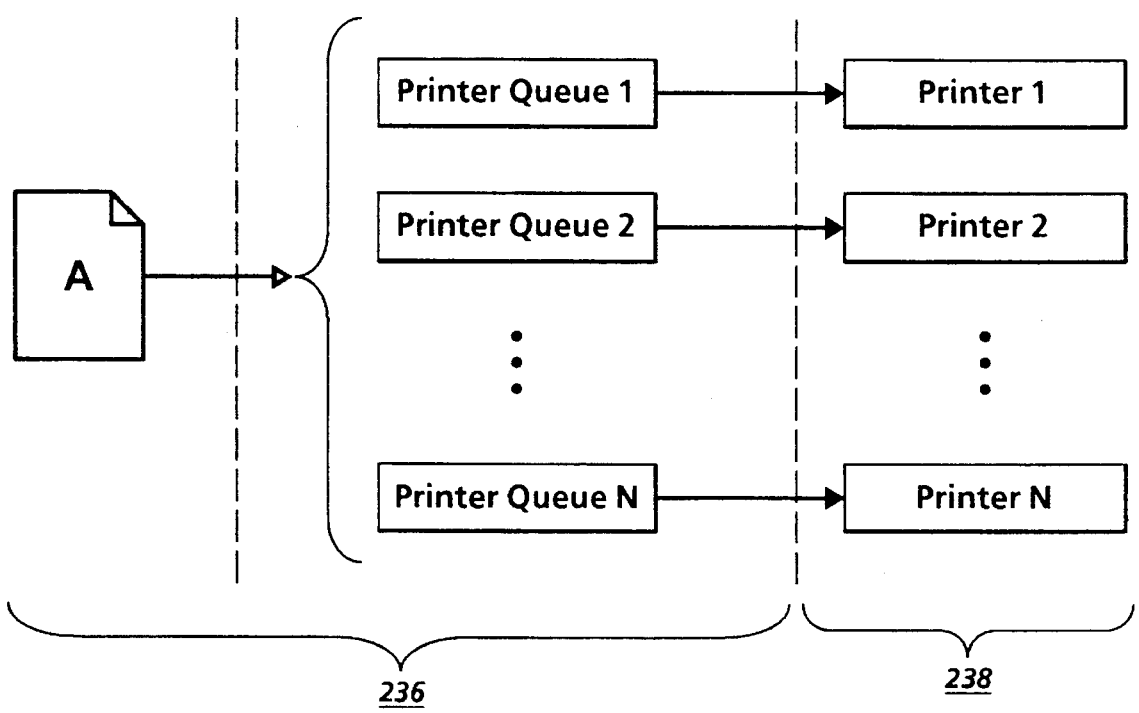

FIGS. 3–5 comprise a schematic block diagram showing the major parts of the control section for the printing system shown in FIG. 1;

FIG. 6 is a view depicting an exemplary job programming ticket and job scorecard displayed on the User Interface (UI) touchscreen of the printing system shown in FIG. 1, the job ticket and job scorecard being associated with a job to be printed;

FIG. 7 is a schematic view depicting a Job File and a Print Queue;

FIG. 8 is an elevational view of the User Interface touchscreen display depicting a queue of typical Job Files for jobs in the system;

FIG. 9 is an elevational view of the User Interface touchscreen display depicting a print queue of typical jobs to be printed;

FIG. 10 is a schematic view depicting the manner in which job run information for printed copies of a parent file is stored in a database and related to the parent file;

FIGS. 11 and 12 comprise a flow diagram implementing the technique depicted in FIG. 10; and FIG. 13 is a schematic, block diagram illustrating, in part, the manner in which the technique of the flow diagram of FIGS. 11 and 12 would be used with a server and a bank of printers.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
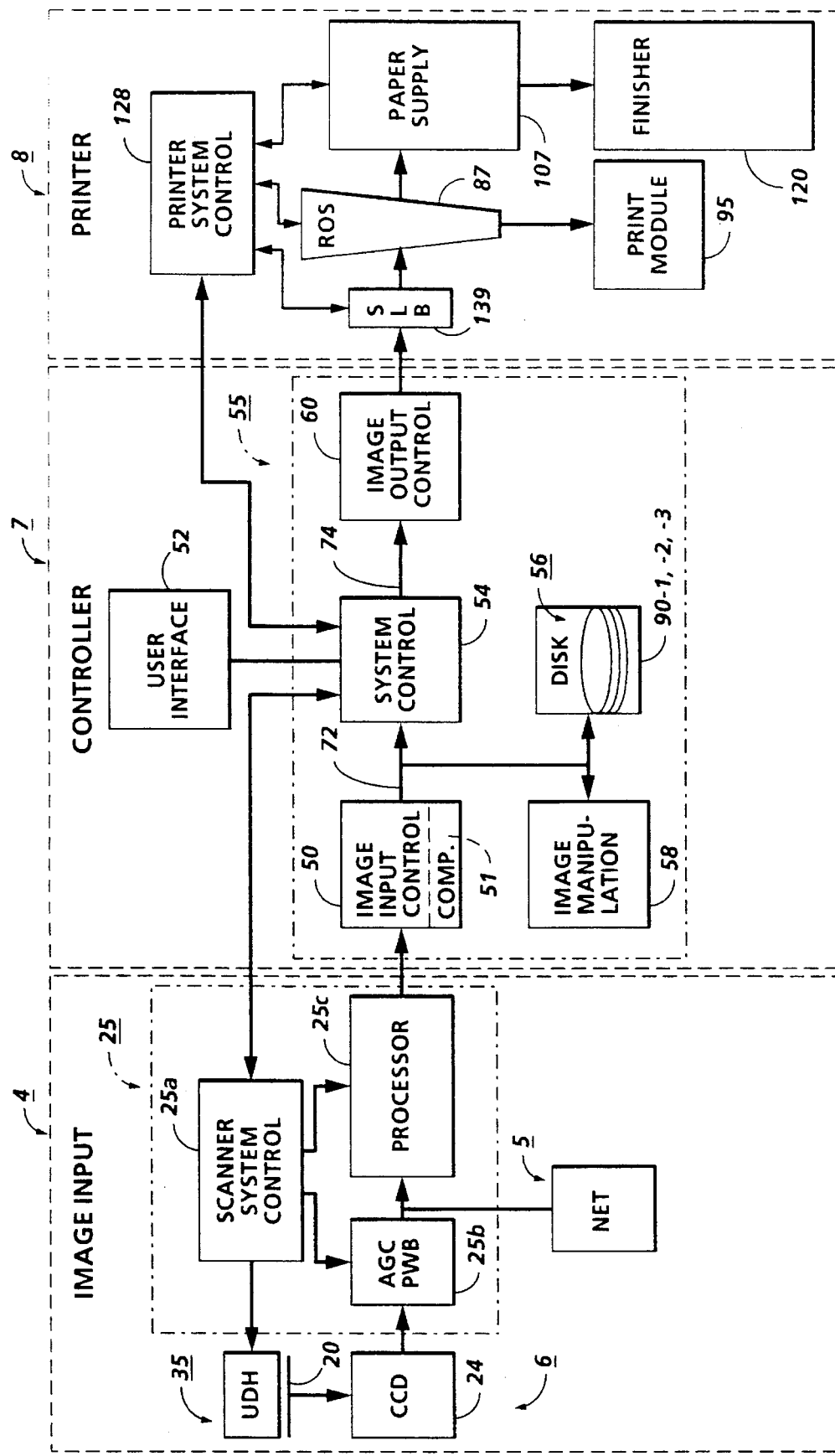
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 4) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3A–3C, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3A-3C), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Referring to FIGS. 7 and 8, the image files are arranged in a job file 155, with the print jobs 156 numbered consecutively in the order in which the print jobs are scanned in. Where the operator wishes to see the jobs currently residing in job file 155, as for example, to select jobs to be moved to the print queue for printing, a SYSTEM FILE icon 157 on touchscreen 62 is actuated. This displays a list 160 of the jobs 156 currently in the job file on screen 62, an example of which is shown in FIG. 8. Each job is identified by a descriptor showing the type of job, job number, number of prints, etc. By using up and down scrolling icons 161,162, the operator can scroll the list of jobs where the number of jobs in the job file is too large to be simultaneously displayed on touchscreen 62.

Referring also to FIG. 9, to print a job 156, the job is copied into a print queue 165. A PRINTER QUEUE icon 167 on touchscreen 62, when actuated, displays the current print queue with a list of the jobs in the queue on touchscreen 62. Each job in print queue 165 has a displayed job descriptor identifying the job, job number, quantity to be printed, paper color, finishing type, etc. Print queue 165 is ordered by priority and time of arrival of the job in the print queue. Other priority orderings may be envisioned.

For printing a job, the image file having compressed image data, image slice pointers, and descriptors of the job is read from disks 90-1,90-2, 90-3 of main memory 56 into system memory 61. The image data is formatted and processed in blocks called bands. Band descriptors, which provide descriptions of the objects within a page, base addresses for all of the scanlines in the band, the start addresses for each band, and the starting position for each page, are created.

Using the image descriptors, band descriptors, and image slice pointers, packets of information, referred to as image parameter blocks containing all the information needed for the image generation processors 86 (seen in FIG. 5A) to retrieve the image data for processing and printing, are created. Processors 86 include a decoder, depredictor, and image generating logic to in effect de-compress the image data and provide the binary image data used by printer section 8 to make prints. As each job is printed, an entry of selected job run information (e.g. prints produced with job) is entered in a job log (not shown). As mentioned above, the job log maintains a record of the job run information for each job printed from the print queue, but does not represent a cumulative record of the job in the job file from which it was copied.

Referring to FIG. 10, a schematic diagram, demonstrating the theory underlying a technique for maintaining a cumulative record of job run information in the job file 155 is discussed. In the preferred mode of operation, a job A, or "Parent" A, is provided to the job file, i.e. the Parent A is stored at a selected memory location in memory 56 (FIG. 2). As will be appreciated by those skilled in the art, the Parent A may come from a variety of sources, such as a scanner, a network or a form of detachable memory (e.g. "floppy disk"). In one example of operation, a plurality of copies of Parent A, or Offspring A 1, A2, A3, . . . AN are transferred to selected memory locations in the print queue 165 over a period of time, i.e. A1 is transferred to the print queue at $t_1$, $A_2$ is transferred to the print queue at $t_2$, and so on. When transferred, the job program for each "child" may be changed by the operator. For example, the quantity of prints to be produced for each child may be varied. It is conceivable that the interval between $t_1$ and $t_2$ could be substantial so that keeping track of the job run information for the Parent A, by scrolling through the job log, could be quite inconvenient. As each of the offspring is transferred to the print queue 165, a database location is set up in a database 200 of the job file 155. As can be recognized, the database could be provided in the job file or in another memory location without altering the concept of the disclosed embodiment. Additionally, the database could be contiguous with the parent. While a single database with a plurality of entries is shown in FIG. 10, a database could be provided for each of the offspring.

As each of the offspring is printed, job run information, for the particular offspring printed, is transmitted to an appropriate location in the database. Job run information may include, among other information, prints produced, time required for printing, and fonts and stock types employed in printing. Upon entering the job run information into the database, cumulative updates for each information type is determined, and a reference, such as pointer 202, is used to link the database with the Parent A. The purpose of the reference is to allow a user of the job file to access current, cumulative job run information regarding the Parent A without searching through the job log and gathering separate pieces of information regarding the printing of the offspring of Parent A. It should be recognized that, in the preferred embodiment, the user is not foreclosed from accessing individual entries in the database to, for example, track historical trends for selected offspring.

Referring to FIGS. 11 and 12, the preferred mode of operation of above-described storage technique is described in further detail. Initially, at step 204, a parent job ("parent") is developed and inserted into the system or job file 155. In one example, as the parent is inserted into the job file, a query is submitted to the machine operator (step 206), asking whether job run information should be stored in memory 56 (FIG. 2). Alternatively, the decision to save job run information could be determined from the state of a switch set in software sometime prior to this time. If there is no desire to save job run information, then the parent is processed normally (step 208) with no job run information being stored. If, on the other hand, job run information is to be saved, then a database is created (step 210) for the parent, or an entry is developed for the parent in a preexisting database. Pursuant to creating the database or making a database entry, the reference 202 (FIG. 10) is provided (step 212) for linking the database with the parent.

Referring to step 216, an exemplary approach for generating and storing job run information is discussed. Initially, a copy of the parent is made. Preferably, it should be determined, via step 218, whether the copy is placed in the job file 155 or the print queue 165. Typically, a copy of a parent is placed in the job file so that it can be edited. If the copy of the parent is edited, then that copy, for purposes of appropriate record keeping, should then become a new parent. Accordingly, at step 220 the copy of the parent assumes the role of a parent and a part of the process is then repeated to set up, if necessary, a database or database entry for the new parent. For a copy of the parent transferred to the print queue the copied job gets a pointer 203 to the database 200 (step 222). Additionally, it may be, under certain circumstances, desirable to change the job ticket of the copied job (step 223). In one example, the parent requires the printing of many sets so that it is desirable to print copies of the parent over a a number of days. In this case, upon copying the parent to the print queue, the number of sets to be printed would be reduced to a suitable number to be printed in the current day. If reprogramming of the job ticket is desired, then the process proceeds to step 224, otherwise, the process proceeds to step 228 where, at an appropriate moment, the offspring is printed.

Referring conjunctively to FIGS. 10 and 12, as the offspring is printed, job run information is, via step 230, generated. Typically, job run information includes among other things, information regarding the number of prints created from the printed offspring, time required to print the offspring, the stock characteristics of the offspring and the fonts used to print the offspring. Pursuant to generating the job run information, it is stored out (step 232) to the database 200 using one of pointers 203 to locate the database.

It will be appreciated by those skilled in the art that the types of job run information provided to the database will vary in accordance with the type of printing system encountered. For example, referring to FIG. 13, the preferred technique is shown in use with a network printing system including a server 236 and a bank of N printers 238. In this example, the offspring A1 (see FIG. 10) is transferred to one of N printer queues for printing by a corresponding printer. Preferably, job run information regarding the printer to which offspring A 1 was transferred is conveyed to the data base 200. In some instances this information can aid the user of job file 155 in deciding which printer s/he desires to use in printing future offspring.

As the job run information is communicated to the database 200, various totals, such as total parent prints produced and time required to print the total parent prints, are generated. That is, at step 240, new job run information is added to previously stored job run information in order to update the database. As further printing of offspring is desired, the process defined by FIGS. 11 and 12 is repeated beginning at step 216.

Numerous advantages of the above-described preferred embodiment will be appreciated by those skilled in the art. First, the above-described technique permits job run information to be stored cumulatively in one convenient location. In this way, job run information regarding a parent job can be updated readily as offspring are printed over an extended period of time. Moreover, by storing the job run information in one location, the need for a user to scroll through a print log is eliminated. Second, the above-described technique permits comprehensive records regarding various job runs to be maintained in a database. In one example the user can determine any substitutions, such as font or stock substitutions, required to achieve printing. Moreover, the user can determine the time required to print one or more offspring in order to judge the level of productivity of a job. Finally, the technique accommodates for record-keeping in those situations in which substantial edits are performed on the parent. More particularly, when editing is performed on a parent, the technique prompts the user to employ a new database location for the edited job.

What is claimed is:

1. A printing system, including a print engine and a user interface with a screen display, for producing prints from copies of a parent job including a plurality of attributes defined by a first set of print-related values, comprising:

a nonvolatile memory section for storing the parent job;

a print queue, communicating with said nonvolatile memory section for receiving, from said nonvolatile memory section, a first copy of the parent job at a first time ($t_1$) and a second copy of the parent job at a second time ($t_2$), the first copy of the parent job and the second copy of the parent job being respectively provided with a second set of print-related values and a third set of print-related values, the first copy of the parent job being printed, with the print engine, at a third time ($t_3$) in accordance with the second set of print-related values, and the second copy of the parent job being printed at a fourth time ($t_4$) in accordance with the third set of print-related values, wherein a first subset of the second set of values is created in response to the printing of the first copy of the parent job at $t_3$ and a second subset of the third set of values is created in response to the printing of the second copy of the parent job at $t_4$, the first and second subsets respectively describing a record of prior printing operations for the first copy of the parent job and a a record of prior printing operations for the second copy of the parent job; and a database, formed in a second nonvolatile memory section, for storing the first and second subsets, each of the first and second subsets being referenced to the parent job so that values for each of the first and second subsets are accessible, for display on the screen display, in a minimum amount of access time.

2. The printing system of claim 1, wherein the first subset is referenced to the parent job with a first pointer and the second subset is referenced to the parent job with a second pointer.

3. The printing system of claim 1, wherein the first and second subsets are combined to form a cumulative record of the printing operations performed on the first and second copies of the parent job.

4. The printing system of claim 1, wherein the cumulative record includes a cumulative value for a total number of prints generated from the first and second copies of the parent job.

5. The printing system of claim 1, in which the printing of the first copy of the parent job is facilitated by referring to a programmable job ticket with the plurality of attributes and one of the attributes calls for an image to be supplied during the printing of the first copy of the parent job, wherein, during the printing of the first copy of the parent job a substitute image is substituted for the called for image, and wherein information regarding the substitute image is included in the first subset.

6. The printing system of claim 1, in which the printing of the first copy of the parent job is facilitated by referring to a programmable job ticket with the plurality of attributes and one of the attributes calls for a stock to be supplied during the printing of the first copy of the parent job, wherein, during the printing of the first copy of the parent job a substitute stock is substituted for the called for image, and wherein information regarding the substitute stock is included in the first subset.

7. The printing system of claim 1, in which the print queue is disposed in one of a plurality of printers including a plurality of print queues, respectively, wherein the first subset includes a record of which one of the plurality of print queues was used to hold the first copy of the parent job.

8. The printing system of claim 7, wherein the record of which print queue was used to hold the first copy of the parent job is used to direct the second copy of the parent job to the print queue.

9. The printing system of claim 1, in which the first and second copies of the parent job are transferred from the nonvolatile memory to the print queue, wherein, prior to transferring one of the first copy of the parent job and the second copy of the parent job to the print queue, the one of the first and second copies of the parent job is edited, and wherein any editing of the first copy of the parent job is reflected in the first subset and any editing of the second copy of the parent job is reflected in the second subset.

10. A printing system, including a first print engine, a second print engine and a user interface with a screen display, for producing prints from copies of a parent job including a plurality of attributes defined by a first set of print-related values, comprising:

a nonvolatile memory section for storing the parent job;

a first print queue, communicating with said nonvolatile memory section for receiving, from said nonvolatile memory section, a first copy of the parent job at a first time ($t_1$), the first copy of the parent job being provided with a second set of print-related values, the first copy of the parent job being printed, with the first print engine, at a third time ($t_3$) in accordance with the second set of print-related values, wherein a first subset of the second set of print-related values is created in response to the printing of the first copy of the parent job at $t_3$, the first subset describing a record of prior printing operations for the first copy of the parent job;

a second print queue, communicating with said nonvolatile memory section for receiving, from said nonvolatile memory section, a second copy of the parent job at a second time ($t_2$), the second copy of the parent job being provided with a third set of print-related values, the second copy of the parent job being printed, with the second print engine, at a fourth time ($t_4$) in accordance with the third set of print-related values, wherein a second subset of the third set of print-related values is created in response to the printing of the second copy of the parent job at $t_4$, the second subset describing a record of prior printing operations for the second copy of the parent job; and a database, formed in a second nonvolatile memory section, for storing the first and second subsets, each of the first and second subsets being referenced to the parent job so that values for each of the first and second subsets are accessible, for display on the screen display, in a minimum amount of access time.

11. The printing system of claim 10, in which the printing of the first copy of the parent job is facilitated by referring to a programmable job ticket with the plurality of attributes and one of the attributes calls for an image to be supplied during the printing of the first copy of the parent job, wherein, during the printing of the first copy of the parent job a substitute image is substituted for the called for image, and wherein information regarding the substitute image is included in the first subset.

12. The printing system of claim 10, in which the printing of the first copy of the parent job is facilitated by referring to a programmable job ticket with the plurality of attributes and one of the attributes calls for a stock to be supplied during the printing of the first copy of the parent job, wherein, during the printing of the first copy of the parent job a substitute stock is substituted for the called for image, and wherein information regarding the substitute stock is included in the first subset.

13. The printing system of claim 10, in which the print queue is disposed in one of a plurality of printers including a plurality of print queues, respectively, wherein the first subset includes a record of which one of the plurality of print queues was used to hold the first copy of the parent job.

14. The printing system of claim 13, wherein the record of which print queue was used to hold the first copy of the parent job is used to direct the second copy of the parent job to one of the plurality of print queues.

15. The printing system of claim 10, wherein the first print queue and the second print queue are disposed in a common printing machine.

16. The printing system of claim 10, wherein the first print engine is disposed in a first printing machine and the second print engine is disposed in a second printing machine with the first and second printing machines being separate devices.

17. The printing system of claim 10, in which the first and second copies of the parent job are transferred from the nonvolatile memory to the first and second print queues, respectively, wherein the first copy of the parent job is edited prior to transferring the the same to the first print queue or the second copy of the parent job is edited prior to transferring the same to the second print queue, and wherein any editing of the first copy of the parent job is reflected in the first subset and any editing of the second copy of the parent job is reflected in the second subset.

* * * * *